Patented Feb. 13, 1934

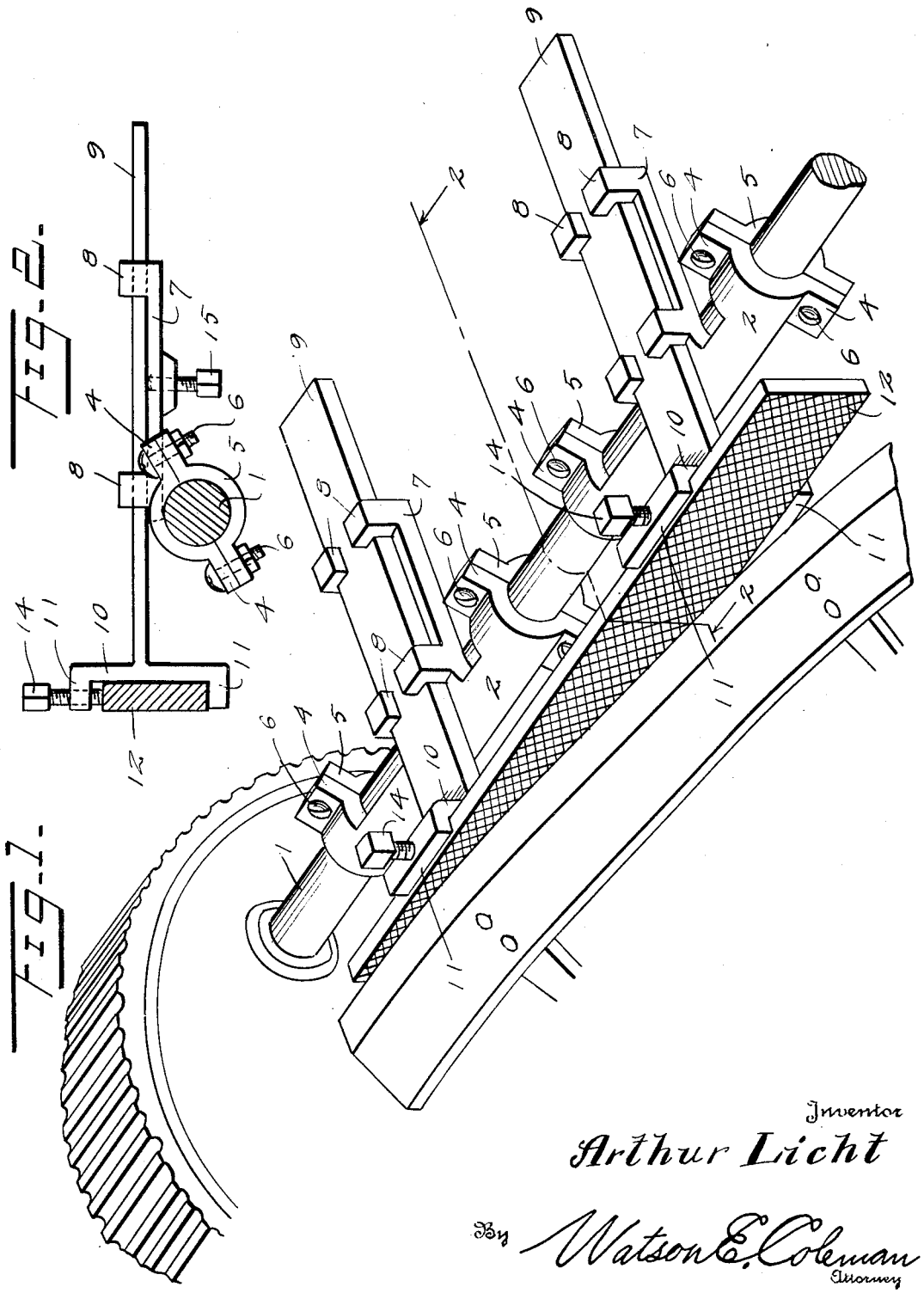

1,947,298

UNITED STATES PATENT OFFICE 1,947,298

LAWN MOWER SHARPENER

Arthur Licht, Fulton, S. Dak.

Application March 24, 1931. Serial No. 524,909
Renewed December 12, 1933

1 Claim. (Cl. 76—82.1)

This invention relates to a lawn mower sharpener, and it is an object of the invention to provide a device of this kind which is adapted to be mounted upon the connecting bar or other suitable part of the mower structure and which embodies means whereby the sharpening element may be adjusted or positioned to assure effective action upon the mower blades.

The invention consists in the details of construction and in the combination and arrangement of the several parts of my improved lawn mower sharpener whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a fragmentary view in perspective of a lawn mower showing applied thereto a sharpener constructed in accordance with an embodiment of my invention;

Figure 2 is a detailed sectional view taken substantially on the line 2—2 of Figure 1 looking in the direction of the arrow.

As disclosed in the accompanying drawing, 1 denotes a conventional connecting bar comprised in a lawn mower structure and upon which my sharpener is adapted to be mounted. In the present embodiment of my invention my sharpener comprises a pair of elongated members 2 of such cross sectional configuration to have close contact with the bar 1 and each of which being provided at its opposite end portions with the outstanding ears 4 to afford means whereby the clamp members 5 disposed around the lower or opposite portion of the bar 1 may have requisite coaction with the ears 4 through the medium of the screws 6 or the like to effectively clamp the member 2 in desired position upon the bar 1.

Integrally formed with the upper marginal portion of each of the members 2 and extending rearwardly therethrough when the device is in applied position upon the bar 1, is an elongated arm 7 provided adjacent its opposite end portions with inwardly disposed clips 8, thus providing means whereby an elongated member 9 may be slidably supported upon the arm 7.

The outer or forward end of each of the elongated members 9 carries a plate 10 substantially at right angles to the member 9 and which is provided at its upper and lower edges with the forwardly directed flanges 11 between which is adapted to be received an elongated file or kindred sharpening member 12. The upper flange 11 has threaded therethrough a holding screw 14 to assure the desired maintenance of the file or member 12 in applied position.

Each of the arms 7 has threaded therethrough from below a set screw 15 for coaction with the sliding member associated with the arm whereby said sliding member may be effectively held in desired endwise adjustment with respect to the blades of the mower.

By shifting the members 9 lengthwise of the arms 7 the file or kindred sharpening member 12 may be properly adjusted with respect to the mower blades B and, of course, maintained in desired adjustment by the set screws 15. When the file or sharpening member 12 has been properly adjusted the mower blades can be revolved by hand to bring the same into proper engagement with the file or sharpening member 12 to sharpen the blades, or if the adjustment of the file or sharpening member 12 is not too close with respect to the blades B the desired sharpening action can be obtained while the blades are rotating when the mower is in use.

After the desired sharpening of the blades of the mower has been obtained the file or sharpening member 12 can be removed preferably by freeing the elongated members 9 from the arms 7. The members 2 and the arms 7 may remain in applied position upon the bar 1 as when it is desired to resharpen the blades the members 9 may be readily engaged with said arms 7.

The members 2 will be placed upon the bar 1 as the requirements of practice may prefer and it is also to be stated that the flanges 11 of each of the plates 10 are spaced apart a distance sufficient to permit the use of files or kindred sharpening members of differing sizes.

While the file or sharpening member may be of any length it is preferred that it be of such a length as to effect the sharpening of the blades at one end portion and then by shifting the members 2 along the bar 1 the remaining portions of the blades may be sharpened.

It is also believed to be readily understood that the construction of my improved device is such that the file or sharpening member 12 is set in a position with respect to the blades of the mower to make it impossible to sharpen the blades except in a true angle.

From the foregoing description it is thought to be obvious that a lawn mower sharpener constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A lawn mower sharpener comprising a plurality of members, means for attaching said members to a lawn mower and adjacent to the blades of the mower, an arm extending from each of said members in a direction away from the blades of the mower, inwardly disposed clips carried by the opposite end portions of the arm, an elongated member slidably mounted on the arm, said clips coacting with said elongated member to hold the same in applied position, a member threaded through the arm for engagement with the elongated member and coacting with the clips for holding said elongated member against sliding movement, a plate carried by the forward extremity of the sliding member, and means for holding a sharpening element to said plate.

ARTHUR LICHT.